United States Patent
BuAbbud et al.

(10) Patent No.: US 6,668,138 B2
(45) Date of Patent: Dec. 23, 2003

(54) APPARATUS AND METHODS FOR MAINTAINING BALANCED COMMUNICATION CHANNELS WITH INCREASING SERVICE DEMANDS

(75) Inventors: George H. BuAbbud, South Lake, TX (US); Muneer Zuhdi, Lewisville, TX (US); John W. Matthes, Southlake, TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 10/195,087

(22) Filed: Jul. 12, 2002

(65) Prior Publication Data

US 2002/0176137 A1 Nov. 28, 2002

Related U.S. Application Data (63) Continuation of application No. 09/412,416, filed on Oct. 5, 1999, now abandoned.
(60) Provisional application No. 60/135,624, filed on May 24, 1999.

(51) Int. Cl.⁷ ................................................. H04J 14/02
(52) U.S. Cl. ........................ 398/164; 398/115; 398/116; 398/117
(58) Field of Search .......................... 359/163; 398/164, 398/115, 116, 117

(56) References Cited

U.S. PATENT DOCUMENTS

| | | | |
|---|---|---|---|
| 4,061,577 A | 12/1977 | Bell | |
| 4,655,534 A | 4/1987 | Stursa | |
| 4,768,186 A | 8/1988 | Bodell | |
| 5,191,456 A | 3/1993 | Sutherland et al. | |
| 5,349,457 A | * 9/1994 | Bears | 359/118 |
| 5,572,347 A | * 11/1996 | Burton et al. | 359/124 |
| 5,793,507 A | * 8/1998 | Giles et al. | 359/125 |
| 5,808,764 A | * 9/1998 | Frigo et al. | 359/127 |
| 5,911,019 A | * 6/1999 | Cohen | 385/24 |
| 6,080,930 A | 6/2000 | Lommen et al. | 174/35 GC |
| 6,144,472 A | * 11/2000 | Knox | 359/127 |
| 6,160,946 A | 12/2000 | Thompson et al. | |
| 6,362,908 B1 | 3/2002 | Kimbrough et al. | |
| 6,396,611 B1 | * 5/2002 | Distefano et al. | 359/163 |
| 6,411,410 B1 | * 6/2002 | Wright et al. | 359/125 |

OTHER PUBLICATIONS

Patent Abstracts of Japan, vol. 016, No. 247 (P–1365), Jun. 5, 1992 and JP 04 056829 (Nippon Telegr & Teleph Corp) Feb. 24, 1992 abstract.

* cited by examiner

*Primary Examiner*—Leslie Pascal
*Assistant Examiner*—David C Payne
(74) *Attorney, Agent, or Firm*—Jones Day (57) ABSTRACT

Apparatus and methods for maintaining balanced communication channels evenly even with heavy increases in service demands are disclosed. The apparatus uses an arrangement of jumpers and unique connection panes which allow rapid changes in the distribution of similar circuits to achieve balanced loads.

14 Claims, 7 Drawing Sheets

APPARATUS AND METHODS FOR MAINTAINING BALANCED COMMUNICATION CHANNELS WITH INCREASING SERVICE DEMANDS

This application is a continuation of U.S. patent application Ser. No. 09/412,416, filed Oct. 5, 1999, now abandoned the entire disclosure of which is incorporated herein by reference. This application also claims the benefit of provisional application No. 60/135624 filed May 24, 1999.

BACKGROUND OF THE INVENTION

1. Field of the Invention

The present invention relates to methods and apparatus for use in a distribution cabinet of an optical communication system, and more specifically to distribution apparatus which allows the addition on demand of substantially a maximum number of electrical RF (radio frequency) user channels onto a wavelength carrier at a specific wavelength before being required to add another optical transmitter for generating a carrier at a different wavelength. That is, the addition of an optical generator for generating a specific wavelength may be substantially delayed until the optical wavelength carrier in use is almost to saturation. This is done without substantial downtime by making simple terminal connections between the existing panels.

2. Description of Related Art Including Information Disclosed Under 37 CFR 1.97 and 1.98

The communications industry is using more and more optical or light fibers in lieu of copper wire. Optical fibers have an extremely high bandwidth thereby allowing significantly more information than can be carried by a copper wire transmission line such as twisted pairs or coaxial cable. However, because of the different usage of cable modem transmissions in various neighborhoods (commonly referred to as penetration), there may be some areas either business or residential where the penetration is almost one hundred percent. That is, almost every household path (HHP) will require the use of a cable modem transmission whereas other neighborhoods may be at substantially zero penetration.

However, just because an area may be at zero penetration at one point in time suggests that the growth rate in that area may be very rapid, and a need exists so that such rapid grown can be handled quickly and inexpensively without the major addition of new equipment and without significant downtime to the customer.

SUMMARY OF THE INVENTION

The above objects and advantages are achieved in the present invention by distribution apparatus in an optical communication system which allows the addition on demand of substantially a maximum number of cable modem transmission user channels with minimum downtime and at no expense. In areas of low usage or low penetration, an optical fiber may carry a single wavelength of light which is modulated by RF signals around a center wavelength of light of about 1550 nanometers. The same optical fiber carrying the 1550 nanometers of light will typically also be capable of carrying other wavelengths of lights which have center wavelengths close to the 1550 nanometers but somewhat displaced so as to have good isolation between the signals. For example, if it were desirable to carry three different wavelengths of light, the center frequencies might be selected to be 1545 nanometers, 1550 nanometers, and 1555 nanometers. The use of three different wavelengths of light as discussed will provide ample separation such that there is no cross talk or interference between the different wavelengths of light. In fact, up to eight different and specific wavelengths of light may be selected around the base wavelength referred to as 1550. Each of these different eight wavelengths may be referred to as $\lambda$ such as $\lambda 1$, $\lambda 2$, $\lambda 3$, $\lambda 4$, $\lambda 5$, $\lambda 6$, $\lambda 7$, and $\lambda 8$. The 1550 nanometers of light which is considered a base wavelength is selected to minimize the transmission loss of the optical fibers. Certain ones of the most used optical fibers will typically have transmission characteristics such that certain wavelengths are highly desirable as center wavelengths such as, for example, 1550 nanometers, 1310 nanometers, and 960 nanometers of light. However, to understand how eight different wavelengths of light around the 1550 nanometer length can exist at the same time may best be understood by thinking of the 1550 nanometers being one of the best possible wavelengths for transmission over the optical fiber, yet 1545 and 1555 nanometers also are very efficient transmissions. Therefore, so long as there is sufficient separation between the various wavelengths of light such that there is no cross talk or interference from each of the various wavelength transmissions, there is sufficient bandwidth to readily handle a large number of customers such as, for example, 768 cable modem customers. The novel apparatus of this invention which allows such flexibility, comprises a first group of combining circuits each of which has a plurality of inputs and a single output. Each of the combining circuit inputs is capable of receiving an input signal on each one of the plurality of input terminals. The plurality of input signals which may be of different frequencies are then directly combined by the combining circuits and provided as an output signal made up of these combined received input signals on the single output terminal. In a preferred embodiment, the plurality of inputs and the single output terminate in an SMB-type coax connector. Further, each one of the inputs may itself be carrying signals from up to at least 24 HHP's (household paths) or cable modem customers. The inputs to the input terminals are provided by a multiplicity of input cables each of which may be carrying, as mentioned above, up to at least 24 different channels or signals from 16 different cable modem customers. Each one of the input cables will also terminate with an SMB connector suitable for mating with the SMB connectors on the first group of combining circuits. There is also a second group of combining circuits similar to the first group in that they also have a plurality of inputs and a single output. Each one of the second group of combining circuits receives one of the outputs from one of the first group of combining circuits and then, as in the same manner as with respect to the first group of combining circuits, combines these inputs to produce a combined output signal which is made up of all of the output signals received from the first group of combining circuits. The inputs of this second group of combining circuits is also a first type of connector, such as an SMB connector as discussed above.

Then, depending upon the level of penetration, the output of the second group of combining circuits may go directly to an optical transmitter which generates light over a frequency band at a very select center wavelength around 1550 nanometers of light. Alternately, the output from the second group of combining circuits goes to a third or final combining circuit. The final combining circuit, in the same manner as the first and second groups of combining circuits, receives the output from the second group of combining circuits as input signals and combines these signals into a final or modulation output signal which is used to modulate the wavelength of light generated by the optical transmitter.

BRIEF DESCRIPTION OF THE DRAWINGS

These and other features of the present invention will be more fully disclosed when taken in conjunction with the following Detailed Description of the Invention in which like numerals represent like elements and in which.

DETAILED DESCRIPTION OF THE INVENTION

Figure 1:
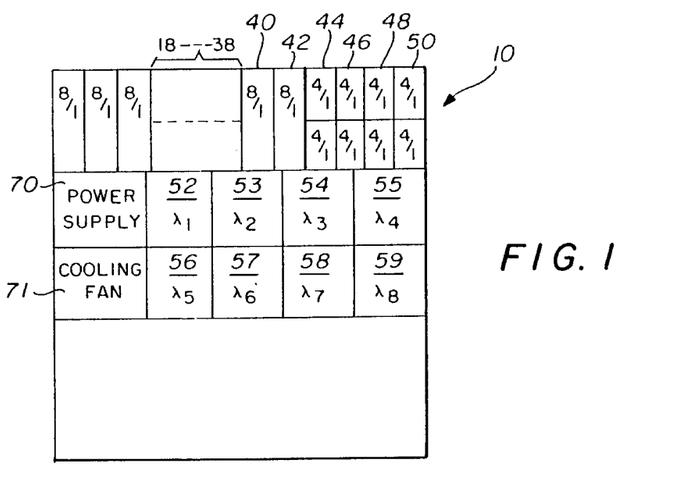
FIG. 1 is a distribution cabinet or other support structure showing apparatus as used in the present invention.

Referring now to FIG. 1, there is shown a distribution cabinet or other support structure 10 supporting the distribution apparatus of the present invention. According to the embodiment shown, there are sixteen distribution panels 12–42 having eight inputs and a single output. In addition, there are four dual distribution panels 44 through 50 making eight total distribution circuits each of which has four inputs and a single output. Also shown are eight optical transmitters for generating eight different and specific wavelengths of light $\lambda 1$–$\lambda 8$ having reference numerals 52–66. Also shown is a power supply 70 for providing power to the optical transmitters. It will also be appreciated that a fan 71 could be included for keeping the rack and the equipment cool.

Figure 2:
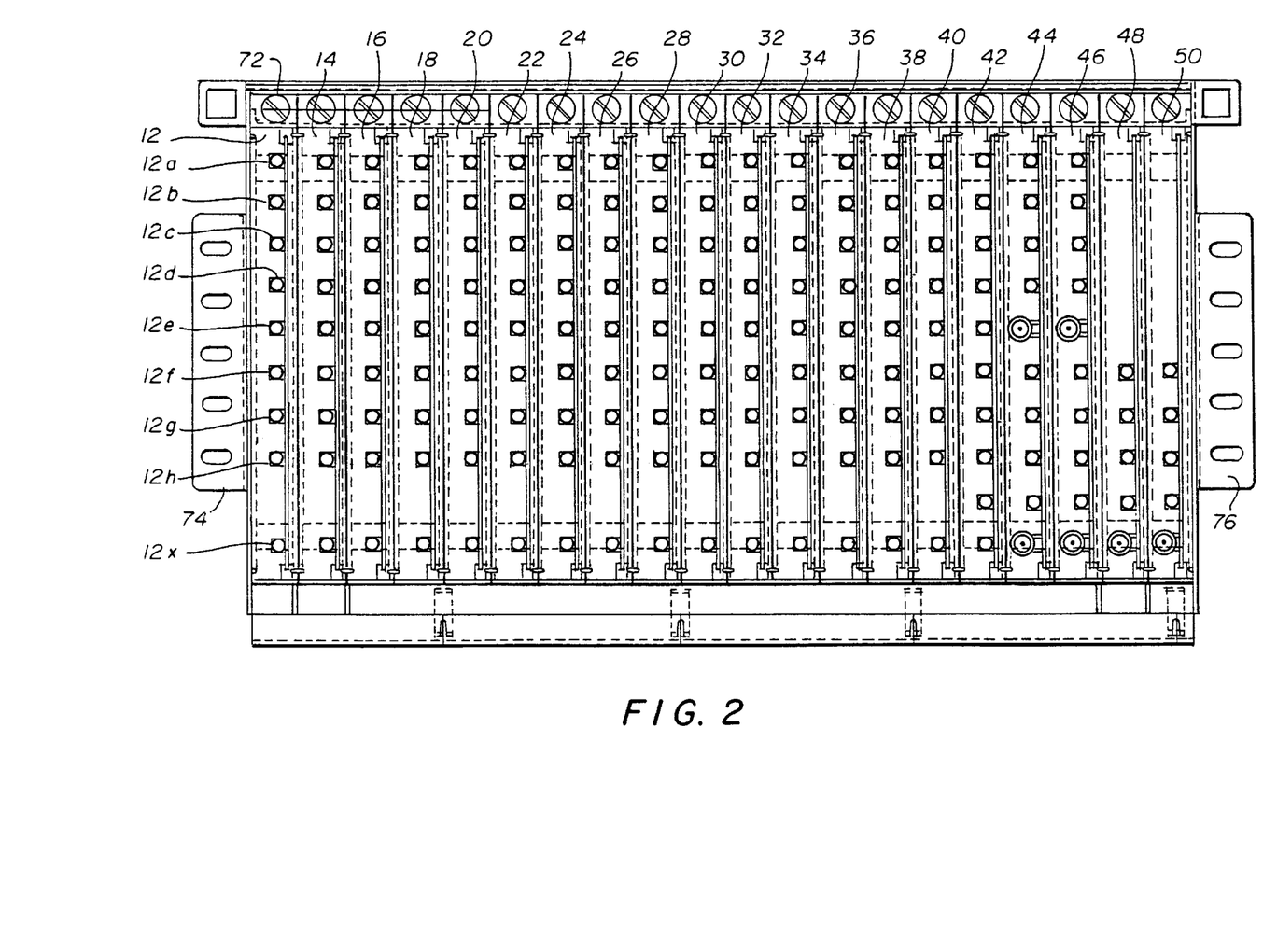
FIG. 2 shows the densely aligned panels or combining circuits of the present invention.

Referring now to FIG. 2, there is shown a larger and more detailed view of the twenty different panels 12–50 shown in FIG. 1 and which contain the various types of combining circuits.

As shown, each of the panels or combining circuits 12–42 include eight input terminals or connectors 12A–12H and a single output connector 12. Since each of the panels 12–42 is identical, only one will be discussed. Also as shown, each of the panels 12–42 as well as each of the dual panels 44–50 according to the present embodiment include a securing bolt 72 which secures the densely arranged panels 12–50 to the rack area or pocket 73. Also shown attached to the rack area or pocket 73 are mounting brackets 74 and 76 for mounting the rack area to the support structure.

Figure 3A:
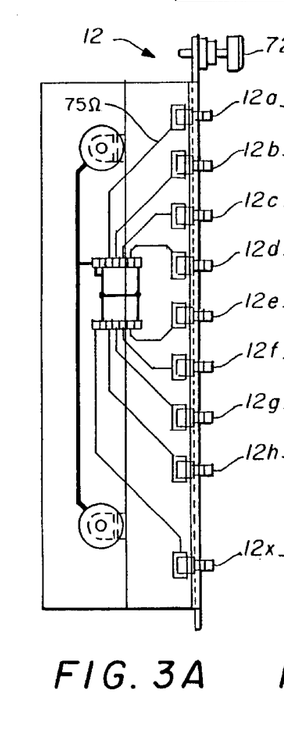
FIGS. 3A and 3B show the side and front views of a type of combining circuit having eight similar input connectors and a single output connector.

Referring now to FIG. 3A, there is shown a side view and a front view of panel 12. As was discussed above, the purpose of the panel containing the combining circuit is to receive signals on the input connectors 12A–12H and provide an output on the output connector 12. Thus, there is a copper path from the connector 12A to 12. It will also be appreciated, by those skilled in the art, that since the electrical paths from the input connectors 12A–12H as well as the output path going to connector 12 are all carrying signals having a frequency in the megahertz range, the conductive path should maintain a constant impedance such that there will not be an impedance mismatch with the resulting signal attenuation and reflection. In the embodiment shown, the conductive paths maintain a 75-ohm impedance between the inputs 12A–12H and the output 12 such as commonly required by coaxial cable. In the embodiment shown in FIGS. 3A and 3B, the input connectors 12A–12H are SMB connectors as is the output connector 12. It will also be appreciated that if necessary the paths could be made to have a different constant impedance path.

Figure 3B:
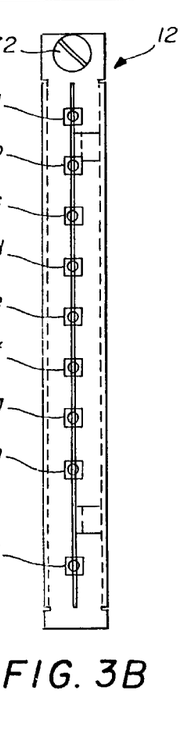
Figure 4A:
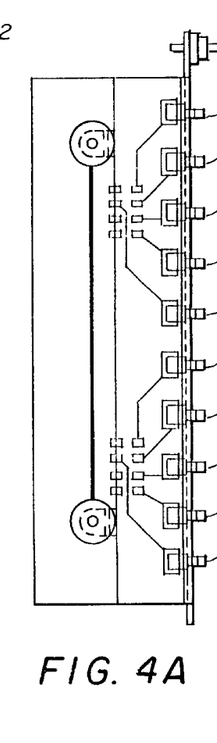
FIGS. 4A and 4B show another type of panel similar to FIG. 3A and 3B except that it has two independent combining circuits each of which has four inputs and a single output.
Figure 4B:
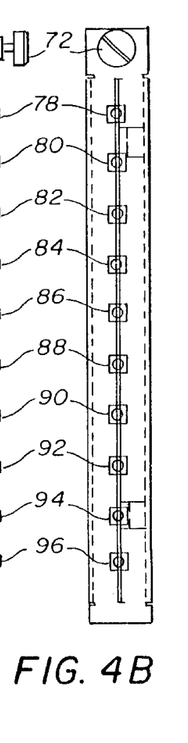

Referring now to FIGS. 4A and 4B, there is shown a side view and a front view of another combining circuit similar to that of FIGS. 3A and 3B except the combining circuit of this Figure is a dual combining circuit. According to this embodiment, each one of the dual circuits includes four inputs 78, 80, 82, and 84 and a single output 86. The panels shown in FIGS. 4A and 4B are typically used in areas of low penetration where these panels represent the second combining circuits which go to a third and final combining circuit. According to this embodiment, all the input connectors are SMB as are the output connectors, although it will be appreciated that other types of connectors are still within the scope of this invention.

Figure 5A:
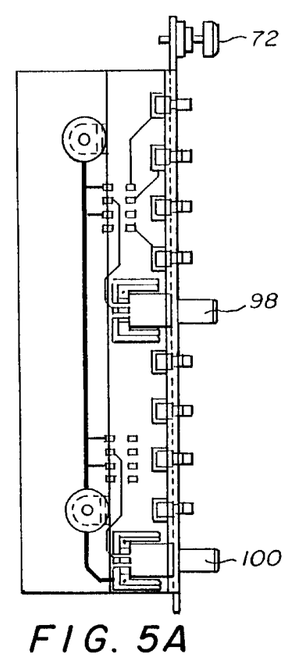
FIGS. 5A, 5B, and 5C show still another type of combining circuit which produces a final or modulating output going to the light generator for modulating the specific wavelength of light. According to one embodiment, each of these combining circuits has four inputs of one type connector and a single output of a different type connector.
Figure 5B:
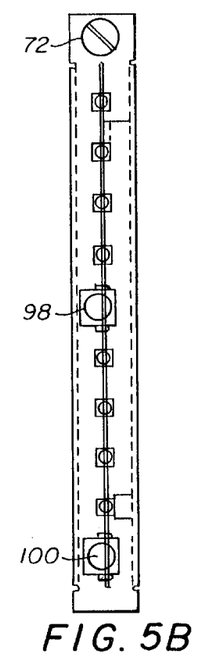
Figure 5C:
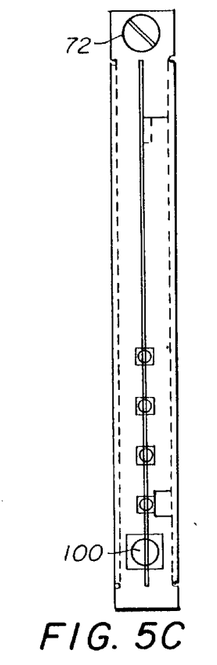

Referring now to FIGS. 5A, 5B, and 5C, there is shown a side view of a panel with two different front views. Panels 5A and 5B are substantially the same as that discussed with respect to FIGS. 4A and 4B except the output connectors 98 and 100 are of the larger, sturdier type "F" type coax connector. The face plate or front view of FIG. 3 shows an alternate embodiment wherein only one of the combining circuits on the panel is used since that there are only four inputs and a single output 100.

Figures 6A, 6B:
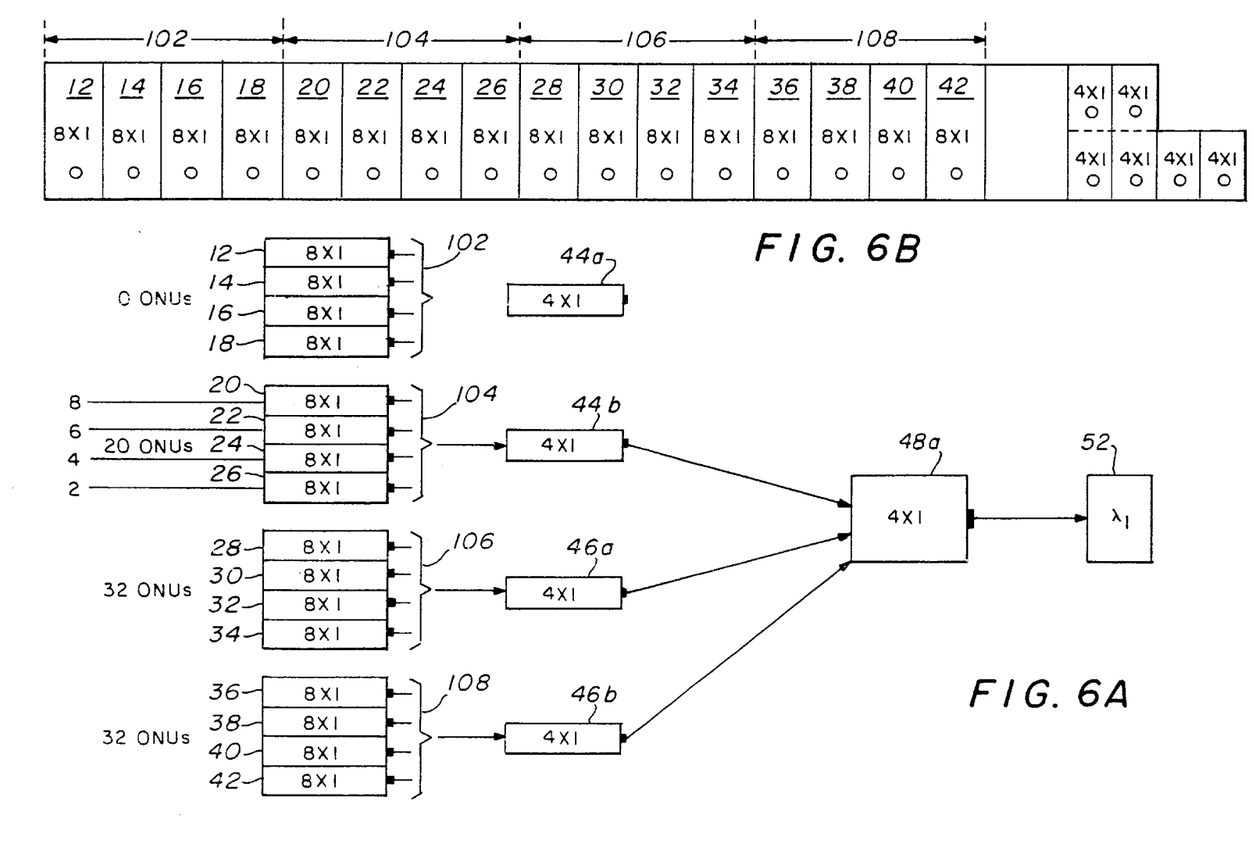
FIGS. 6A and 6B show a typical type arrangement and connections for the apparatus of this invention for a distribution area with low penetration or user demand.

Referring now to FIGS. 6A and 6B, there is shown a simplified block diagram of the electrical cable connections between the panels containing the combining circuits of the present invention. In this particular embodiment, the 8-input/1-output panels are divided into four groups of four panels each, these groups are referred to as 102, 104, 106, and 108. Referring again to FIG. 2, it can be seen that each one of the panels 12–42 can receive eight inputs to provide one output. In the embodiment shown, the connections are for a low penetration area and as shown the first group 102 of panels has no inputs that is, these panels are not being used. However, in the second group, there are 20 inputs from 20 separate distribution panels coming into the four panels. As an example only, panel 20 is shown as receiving eight inputs, panel 22 six inputs, panel 24 four inputs, and panel 26 two inputs. Since each one of the panels 20–26 does receive at least two inputs and up to eight inputs, each one of these panel outputs provides an input to the panel 44B. It should be noted, of course, that with respect to panels 12–18, which receive no inputs, there is no need to make connections between these panels and the 4-input/1-output panel 44A as is indicated by the "X" 107. In a similar manner, groups 106 and 108 receive 32 inputs for the four panels or eight inputs per panel. Thus also as was the case with the group 104, each one of the panels 28–34 and 36–42 provides a single output to the four inputs of the 4-to-1 combining panel 46A and 46B. Thus, as was discussed, since each one of the panels 44A, 44B, 46A, and 46B may receive up to four inputs each, they will each be capable of providing a single output to the 4-to-1 combining panel 48A, which will in turn combine the inputs and provide a single output to the optical transmitter 52 to modulate the specific wavelength of light λ1.

Figure 7:
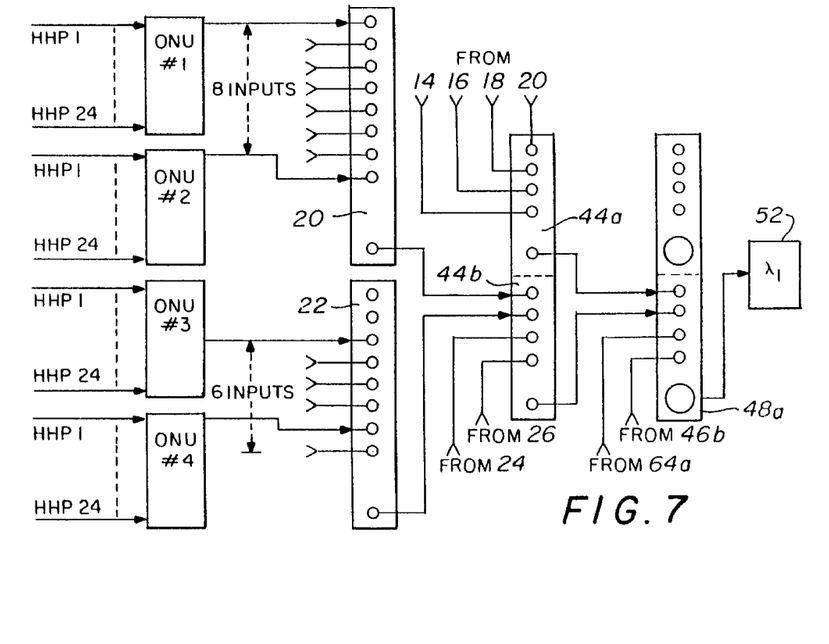
FIG. 7 is a simplified schematic showing the HHP (household path) inputs (individual modem user) through the distribution apparatus of this invention to the light generation and modulation circuit which produces the light having a specific wavelength such as 1545 nanometers and referred to in this example as $\lambda 1$. This figure is representative of the low penetration of FIGS. 6A and 6B.

To better illustrate the connections, FIG. 7 shows an overall schematic diagram of an input from a single ONU (optical network unit) to the light generator 52. The light generated by generator 52 is modulated with all of the signals on that path. As shown, the HHP's (household paths) or user inputs are provided to a distribution panel referred to as ONU No. 1 and provides one of the inputs to the 8-to-1 distribution on combining circuit 20. In a similar manner, although not shown, there are six ONU's 9–18 providing inputs to six of the inputs on combining circuit 22. The outputs of each of the combining circuits 20 and 22 are then provided to one portion of the dual 4-to-1 combining circuits 44A and 44B. The output of this circuit 44B is then provided to one of the inputs of the circuit 48A as are inputs from the other 4-to-1 combining circuits 44A, 46A, and 46B. As shown, the output of the combining circuit 48A is provided to the light generator 52 for modulating the wavelength of light λ1. Most arrangements assume about 96 users or different modems can be handled by any one of the single wavelengths of light λ-λ8. Consequently, a single rack of 20 different panels such as shown in FIG. 2 can handle up to approximately 768 customers by using eight different wavelengths of light λ1 through λ8. However, the rack may actually be able to receive a higher number of HHP's such as, for example 2016.

Figure 8A:
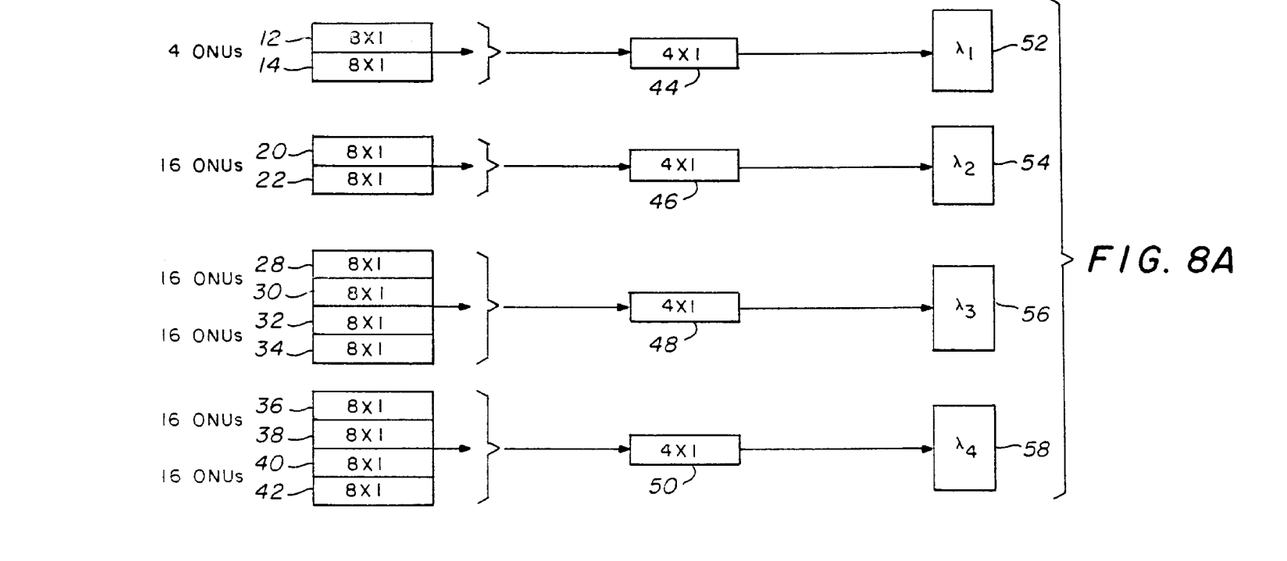
FIGS. 8A and 8B show the apparatus of this invention connected in a manner suitable for an average amount of cable modem users or medium penetration.
Figure 8B:
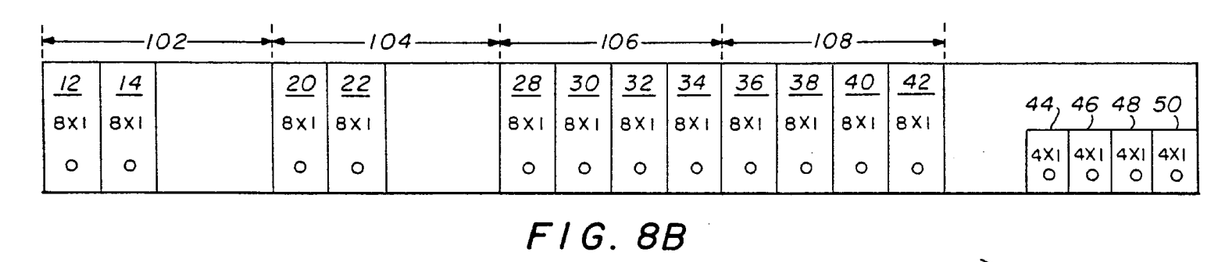

Referring now to FIGS. 8A and 8B, there is shown a block diagram schematic for a medium penetration arrangement. As shown in this embodiment, the 8-to-1 combining circuits 16, 18, 24, 26 are not used as indicated by the "X" through these panels. Thus as shown in FIG. 8A, the two panels 12 and 14 of group 102 provide outputs to two of the inputs to a final combining circuit 44. It will be recalled that the 8-to-1 combining circuits 16, 18, 24, and 26 are not being used in the illustrated embodiment. Likewise, half of each of the circuits 44, 46, 48, and 50 are shown as not being used by means of the "X" through these circuits. Thus, the outputs from panels 12 or 14 are provided as two inputs to the final combining circuit 44 which output is then provided as an input to light generator 52 which produces a specific wavelength λ1 modulated by the output of combining circuit 44. Similarly, the two outputs from panels 20 and 22 are provided to two of the four inputs of the 4-to-1 combining circuit 46 which in turn provides a modulating output to light generator 54 which produces a wavelength of light λ2. Also, each of the four panels in group 106 provides an input to panel 48 which then provides its single output to light generator 56 which produces a wavelength of light λ3. Finally, panels 36–42 provide four single outputs to the inputs of 4-to-1 combining circuit 50 which in turn provides a single modulating output to light generator 58 which generates a wavelength of light λ4.

Figure 9A:
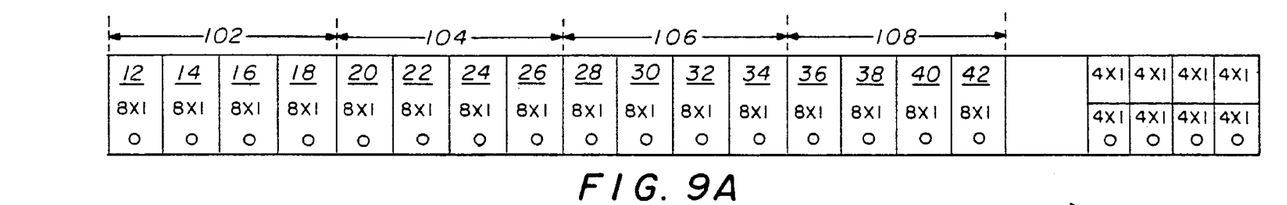
FIGS. 9A and 9B show the apparatus of the present invention arranged for use in an area of high penetration.
Figure 9B:
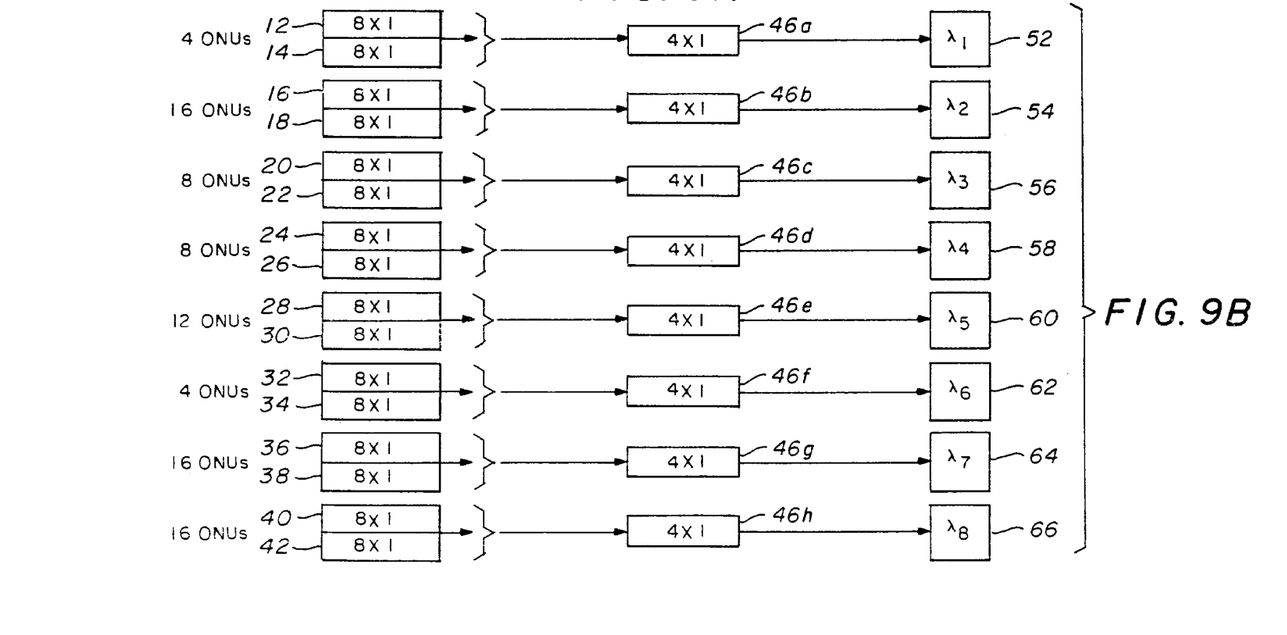

For a high penetration area, and as shown in FIGS. 9A and 9B, each one of the 8-to-1 combining circuits produces one output such that each of the final combining circuits 44A, 44B, 46A, 46B, 48A, 48B, 50A, and 50B each receive two inputs and provide one output to their respective light generators 52–56 to modulate wavelengths of light λ1–λ8.

Figure 10:
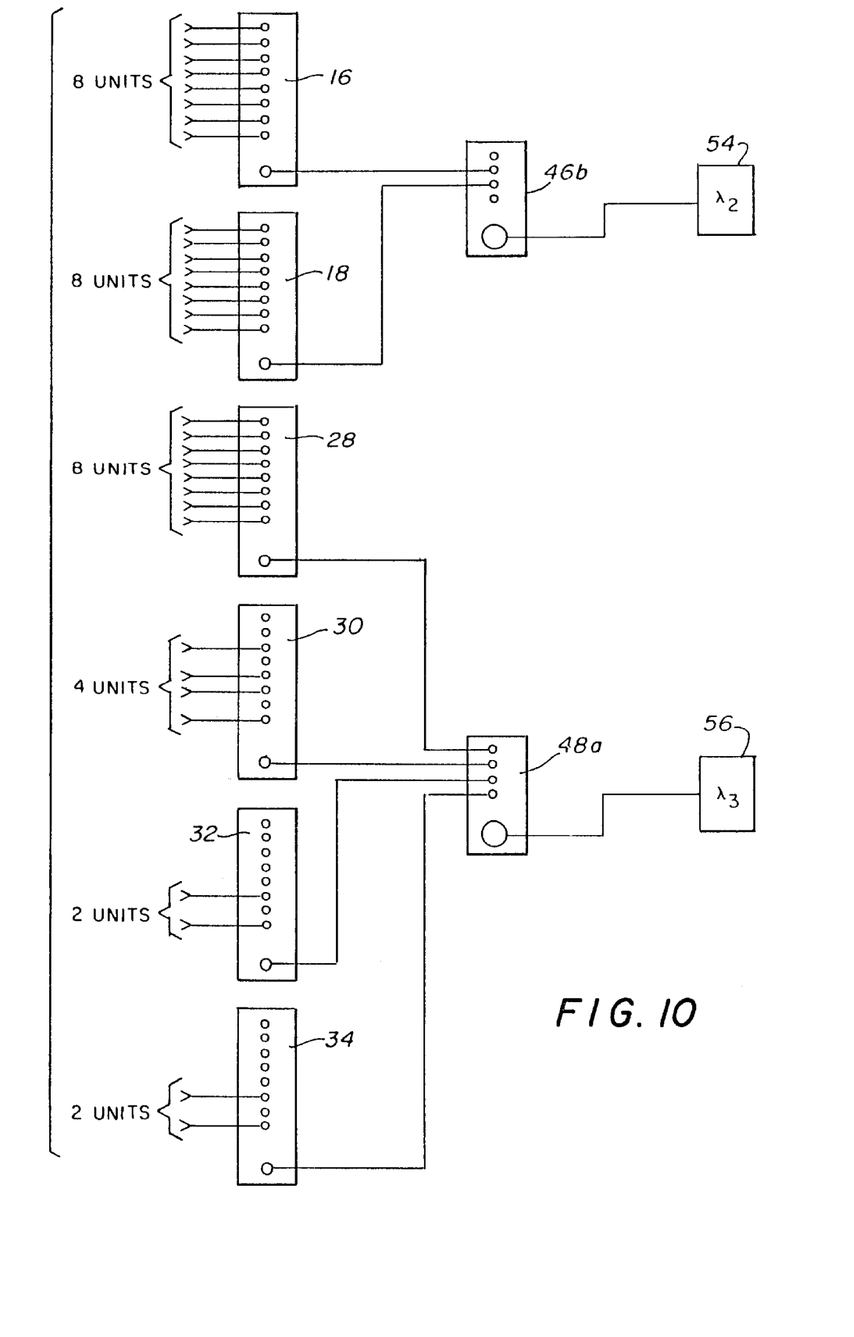
FIG. 10 shows a block diagram schematic of portions of the apparatus of this invention as it may be arranged for medium or high penetration.

Referring now to FIG. 10, there is shown a schematic connection of the panels 16–34 as used in the mid-penetration arrangement earlier shown in FIGS. 8A and 8B. It will also be appreciated that the connections shown for panels 16 and 18 of the 8-to-1 combining circuits and the panel 46 of the 4-to-1 combining circuits providing a single output to light generator 52. This arrangement is the same as used in the high penetration arrangement for these panels shown in FIGS. 9A and 9B.

The corresponding structures, materials, acts, and equivalents of all means or step plus function elements in the claims below are intended to include any structure, material, or act for performing the function in combination with other claimed elements as specifically claimed.

What is claimed is:

1. Distribution apparatus in an optical communication system to allow radio frequency (RF) user channels to be added to a specific optical wavelength carrier channel until bandwidth saturation of the specific optical wavelength carrier channel is reached before being required to add another optical wavelength carrier channel at a different optical wavelength, comprising:

a first group of combining circuits, each combining circuit having a plurality of inputs and an output, each combining circuit suitable for receiving an input signal on each one of said plurality of inputs and for providing an output signal comprised of said received input signals on said output, said plurality of inputs and said output terminating with a first type of connector;

a multiplicity of input cables, each one of said input cables carrying an input signal and terminating with a connector suitable for connecting with one of said first type of connectors on said first group of combining circuits;

a second group of combining circuits, each one of said second group of combining circuits having a plurality of inputs and an output, and each one of said plurality of inputs of said second group suitable for receiving one of said output signals from one of said first group of combining circuits and each one of said second group of combining circuits providing a combined output signal at its output comprised of said output signals received from said first group of combining circuits, said plurality of inputs on each of said second group of combining circuits terminating with one of said first type of connectors;

a first group of connecting cables terminated at each end with a connector suitable for connecting with one of said first type of connectors, each of said first group of connecting cables connecting an output from one of said first group of combining circuits to one of said inputs on one of said second group of combining circuits; and a plurality of optical transmitters, each optical transmitter operable to generate a carrier wavelength of light corresponding to a specific optical wavelength carrier channel, and further operable to receive one of said combined output signals from said second group of combining circuits and modulate said carrier wavelength of light according to said received one of said combined output signal, each of said plurality of optical transmitters having a different carrier wavelength of light so that when a bandwidth saturation of said specific optical wavelength carrier channel is reached another optical wavelength carrier channel at a different optical wavelength may be added on demand.

2. The apparatus of claim 1 wherein each one of said first group of combining circuits are located in a readily releasable panel installed in a support structure.

3. The apparatus of claim 1 wherein at least two of said second group of combining circuits are located in a single, readily releasable panel installed in a support structure.

4. The system of claim 1 wherein said first type of connector is an SMB connector.

5. The apparatus of claim 1 wherein said first group of combining circuits combine up to eight input signals for each output.

6. The apparatus of claim 1 wherein said first group of combining circuits combine up to eight input signals for each output and said second group of combining circuits combine up to four input signals for each output.

7. A method for incrementally providing radio frequency (RF) user channels to a specific optical wavelength carrier channel until bandwidth saturation of the specific optical wavelength carrier channel is reached before being required to add another optical wavelength carrier channel at a different wavelength, the method comprising the steps of:

receiving one each of a multiplicity of input signals at a plurality of inputs on a first group of combining circuits;

combining said input signal at each of said first group of combining circuits and providing an output signal from said each one of said first combining circuits, said output signal comprised of said combined input signals;

receiving output signals from at least two combining circuits of said first group at two inputs of a plurality of inputs on one of a second group of combining circuits;

combining said received output signals by one of said second group of combining circuits and providing a combined output signal from each one of said second combining circuits, said combined output signals comprised of said received output signals; and for each of said combined output signals generated from each of said second combining circuits, selectively modulating one or more optical carrier signals with the combined output signals according to a bandwidth saturation condition, each of the one or more optical carrier signals defined by a different optical wavelength.

8. The method of claim 7 wherein the selectively modulating one or more optical carrier signals with the combined output signals step comprises the steps of:

receiving combined output signals from at least two combining circuits of said second group at two inputs of a plurality of inputs on a final combining circuit; and combining said received combined output signals at said final combining circuit and providing a modulated optical carrier signal from said final combining circuit, said modulated optical carrier signal comprised of said combined output signals.

9. A method of providing a plurality of user channels over a plurality of optical communication channels, the method comprising the steps of:

determining a bandwidth for each optical communication channel;

selecting a first optical communication channel from the plurality of optical communication channels;

incrementally receiving user channels;

combining the received user channels into a plurality of first combined user channels;

determining if the plurality of first combined user channels exceeds the bandwidth of the first optical communication channel;

upon a negative determination that the plurality of first combined user channels exceeds the bandwidth of the first optical communication channel:
  combining the plurality of first combined user channels into a second combined user channel; and
  transmitting the second combined user channel over a first optical communication channels;

upon a positive determination that the plurality of first combined user channels exceeds the bandwidth of the first optical communication channel:
  selecting a second optical communication channel from the plurality of optical communication channels;
  combining the user channels as they are incrementally received into a plurality of third combined user channels;

combining the plurality of third combined user channels into a fourth combined user channel; and transmitting the fourth combined user channel over the second optical communication channel.

10. The method of claim 9 wherein the user channels are combined into a plurality of first combined user channels as the user channels are incrementally received.

11. The method of claim 9 further comprising the steps of:

upon a positive determination that the plurality of first combined user channels exceeds the bandwidth of the first optical communication channel:
  selecting a second optical communication channel from the plurality of optical communication channels;
  recombining the user channels received into the plurality of first combined user channels and a plurality of third combined user channels;
  combining the plurality of the first combined user channels and the third combined user channels into the second combined user channel and a fourth combined user channel;
  transmitting the second combined user channel over a first optical communication channel;
  transmitting the fourth combined user channel over the second optical communication channel; and
  determining if the plurality of third combined user channels exceeds the bandwidth of the second optical communication channel.

12. A distribution system for providing a plurality of user channels over a plurality of optical communication channels, the distribution system comprising:

a plurality of first combining circuits, each first combining circuit having a plurality of first inputs and a first output and operable to combine input signals received at the first inputs to provide a combined output signal at the first output, and further operable to receive user channels at the first inputs and provide a first combined user channel at the first output;

a plurality of second combining circuits, each second combining circuit having a plurality of second inputs and a second output and operable to combine input signals received at the second inputs to provide a combined output signal at the second output, a further operable to receive users channels in a first configuration or in a second configuration, the second combining circuits in the first configuration receiving first combined user channels at the second inputs and providing a second combined user channel at the second output, and the second combining units in the second configuration receiving second combined user channels at the second inputs and providing a third combined user channel at the second output; and a plurality of optical transmitters, each optical transmitter operable to generate a carrier wavelength of light corresponding to a specific optical communication channel, and further operable to receive one of said second combined user channels or third combined user channels from said plurality of second combining circuits and modulate said carrier wavelength of light according to said received one of said second combined user channels or third combined user channels, each of said plurality of optical transmitters having a different carrier wavelength of light so that when a bandwidth saturation of said specific optical communication channel is reached, another optical communication channel at a different optical wavelength may be added on demand.

13. The system of claim 12 wherein the plurality of second combining circuits corresponds to the plurality of optical communication channels, and wherein a maximum number of user channels may be provided over the plurality of optical communication channels when each optical communication channel receives combined user channels from its corresponding second combining circuit receiving users channels in the first configuration.

14. The system of claim 12 wherein one of the optical communication channels may receive combined user channels up to a respective bandwidth from one of the second combining circuits in the second configuration by selectively configuring a set of second combining circuits in the first configuration, and providing the second outputs to the one of the second combining circuits in the second configuration.

* * * * *